United States Patent
Hayward et al.

[11] Patent Number: 5,943,457
[45] Date of Patent: Aug. 24, 1999

[54] GENERALIZED RESONANT COUPLER FILTERS

[75] Inventors: Geoffrey Hayward, Edmonton, Canada; Jan Conradi, Corning, N.Y.

[73] Assignee: Telecommunications Research Laboratories, Edmonton, Canada

[21] Appl. No.: 09/047,269

[22] Filed: Mar. 24, 1998

[51] Int. Cl.$^6$ .............................. G02B 6/28; H04J 14/02
[52] U.S. Cl. .......................... 385/24; 385/42; 359/124; 359/127; 359/140; 372/6
[58] Field of Search .................. 385/24, 30, 42, 385/14, 31, 48, 51; 359/115, 124, 127, 140, 153, 161; 372/6, 20

[56] References Cited

U.S. PATENT DOCUMENTS

| | | | |
|---|---|---|---|
| 4,768,850 | 9/1988 | Moslehi et al. | 385/24 |
| 5,396,507 | 3/1995 | Kaminow et al. | 372/20 |
| 5,574,584 | 11/1996 | Darcie et al. | 359/125 |
| 5,657,406 | 8/1997 | Ball | 385/24 |
| 5,675,675 | 10/1997 | Trouchet | 385/24 |
| 5,689,217 | 11/1997 | Gu et al. | 333/116 |
| 5,802,224 | 9/1998 | Okuta et al. | 385/43 |
| 5,818,991 | 10/1998 | Marez et al. | 385/43 |

OTHER PUBLICATIONS

Planar Lightwave Circuit Optical Dispersion Equalizer, Koichi Takiguchi, Katsumari Okamoto, Senichi Suzuki, and Yasuji Ohmori, IEEE Photonics Technology Letters, Jan. 1994, vol. 6, No. 1, pp. 86–88.

*Primary Examiner*—Hemang Sanghavi
*Attorney, Agent, or Firm*—Christensen O'Connor Johnson & Kindness PLLC

[57] ABSTRACT

A signal processing circuit, the signal processing circuit comprising first and second waveguides, a series of successive couplers $C_i$ between the first and second waveguides, the couplers being spaced from each other along the first and second waveguides, the first and second waveguides having a delay differential $\Delta L_k$ between successive couplers $C_{k-1}$ and $C_k$, the delay differentials $\Delta L_k$ not being all the same. The first and second waveguides preferably have delay differentials between successive directional couplers defined by $$\beta \Delta L_k = \beta n_k \Delta L + \Phi_k$$

where $n_k$ is a set of co-prime positive integers, $\beta$ is defined by $\beta + 2\pi n_{eff}/\lambda$, $\Delta L$ is defined by $\Delta L = c/n_{eff}\Delta f$, c is the speed of light in a vacuum, $n_{eff}$ is the effective refractive index of the conduit, $\lambda$ is a wavelength selected from a range of carrier wavelengths $\lambda_1 \ldots \lambda_{NCh}$ for which the add/drop multiplexer is resonant, $\Phi_k$ is a phase parameter between 0 and $2\pi$, and $\Delta f$ is a pre-selected spectral range of the resonant coupler

11 Claims, 9 Drawing Sheets

FIG. 1 – PRIOR ART

GENERALIZED RESONANT COUPLER FILTERS

FIELD OF INVENTION

This invention relates to optical filters and add/drop wavelength division multiplexers for use in optical or electrical signal processing applications.

BACKGROUND OF THE INVENTION

As demand grows to transmit ever more information through optical fiber, there is a growing need for devices capable of performing signal processing in the optical domain. These devices are typically fabricated as planar lightwave circuits (PLCs), that is, optical wave guiding structures deposited on a planar substrate. A PLC design that is particularly useful in many applications (such as add/drop multiplexing, dispersion compensation, and multi-channel filtering) is the Resonant Coupler (RC) [1–4].

The RC is a signal processing circuit structure in which light is coupled back and forth between two wave-guides at a series of directional couplers. Between each neighboring pair of directional couplers, the light in one wave-guide is delayed relative to the other (see FIG. 1). The same optical delay length (to within a wavelength) is introduced between each neighboring pair of directional couplers. The RC is a form of digital delay filter.

Jinguji and Kawachi [2] have demonstrated that one can generate an arbitrary Nth order finite impulse response (FIR) filter with an N stage RC. FIG. 1 shows a schematic of a conventional resonant directional coupler, an N stage RC, defined to consist of N directional couplers separated by N−1 delay lengths. To obtain the desired impulse response, one chooses an appropriate distribution of coupling strengths for the directional couplers and an appropriate distribution of relative phases induced by the delay stages.

References

[1] Kuznetsov, "Cascaded coupler Mach-Zehnder channel dropping filters for wavelength division multiplexed optical systems," *J. Lightwave Technol.*, vol.12, no.2, pp.226–230, 1994.

[2] Jinguji, M. Kawachi, "Synthesis of Coherent Two-Port Lattice-form Optical Delay-Line Circuit," *J. Lightwave Technol.*, vol.13, no.1, pp.73–82, 1995.

[3] Kostrzewa and K. Petermann, "Bandwidth Optimization of Optical Add/Drop Multiplexers Using Cascaded Couplers and Mach-Zehnder Sections," *IEEE Photon. Technol. Lett.*, vol. 7, no. 8, pp.902–904, 1995.

[4] Yaffe, C. H. Henry, M. R. Serbin, and L. G. Cohen, "Resonant couplers acting as add-drop filters made with silica on silicon waveguide technology," *J. Lightwave Technol.*, vol 12, no. 6 pp. 1010–1014, 1994.

[5] B. H. Verbeek, C. H. Henry, N. A. Olsson, K. J. Orlowsky, R. F. Kazarinov, and B. H. Johnson, "Integrate Four-Channel Mach-Zehnder Multi/Demulitplexer Fabricated with Phosphorous Doped $SiO_2$ Waveguides on Si," *J. Lightwave Technol.*, vol 6, no. 6 pp. 1011–1015, 1988.

SUMMARY OF THE INVENTION

Here, we present a novel circuit design—a "generalized resonant coupler" (GRC)—in which all the delay lengths between the couplers need not be the same. In one aspect of the invention, we impose only the condition that the delay lengths have one or more common divisors; the greatest of which we refer to as the "fundamental delay length" or the "delay unit".

Whereas an N stage RC functions as a Nth order FIR filter, an N stage GRC can function as an FIR filter of much higher order. In fact, if the fundamental delay length is $\Delta L$, and the delay length of the k'th stage of a GRC is $$\Delta L_k = n_k \Delta L,$$

where n are co-prime integers for k=1,2 . . . . N, then the GRC functions as an Mth order FIR filter, where, $$M = \Sigma_{k=1}^{N} n_k$$

is the total number of delay units. Since M can be much greater than N, a GRC can generate a higher order FIR filter than a RC with the same number of stages. Looked at from another perspective, when using an RC, one requires M stages to obtain the same transmission response as can be achieved with a GRC having just N stages. There are at least two reasons why this might be desirable.

A dominant source of excess loss for an RC can be the excess loss associated with its couplers (see, for instance, Ref. [5]). A GRC design can offer the opportunity to generate an FIR filter of a given order with fewer couplers (and, therefore, less excess loss) than a RC design.

Further, at least in one application, use of a GRC rather than a RC results in a device that it is less vulnerable to uncertainty in the coupling ratios of its couplers.

The price we pay for using a GRC rather than a RC is that we do not, in general, have complete freedom to specify an arbitrary FIR transmission response. In section II, we shall show that when we use a GRC to generate an Mth order FIR filter, we have freedom to specify only N+1 of the M+1 FIR expansion coefficients. The remaining M−N expansion coefficients are fixed by a set of constraints. Nonetheless, by judiciously choosing the design of the GRC, one can minimize the consequences of not being able to freely specify all of its FIR expansion coefficients.

In the design of an optimal add-drop multiplexer, for large N, an N-stage GRC add-drop multiplexer is capable of selecting a single channel from up to nearly three times as many channels as would be possible with an optimal N-stage RC add-drop multiplexer.

BRIEF DESCRIPTION OF THE FIGURES

There will now be described preferred embodiments of the invention, with reference to the drawings, in which like numerals denote like elements, for the purposes of illustration only, without intended to limit the scope of the invention as defined by the claims, and in which:

DESCRIPTION OF PREFERRED EMBODIMENTS OF THE INVENTION

GRCs as Finite Impulse Response Filters

Let $\Delta L$ be the delay length for an RC filter. This length defines the free spectral range, $\Delta f$, of the filter according to the equation, $$\Delta f = \frac{c}{n_{eff} \Delta L}, \quad (1)$$

where c is the speed of light in vacuum and $n_{eff}$ is the effective index of the waveguide. Let us define a generalized resonant coupler such that an N stage GRC has N delay lengths which are co-prime multiples of $\Delta L$ (i.e., no common divisors other than 1). The free spectral range of this filter is still given by equation (1).

To analyze transmission through an N stage GRC, we make use of a well known transfer matrix formalism (see, for instance, Ref [2]).

Figure 1:
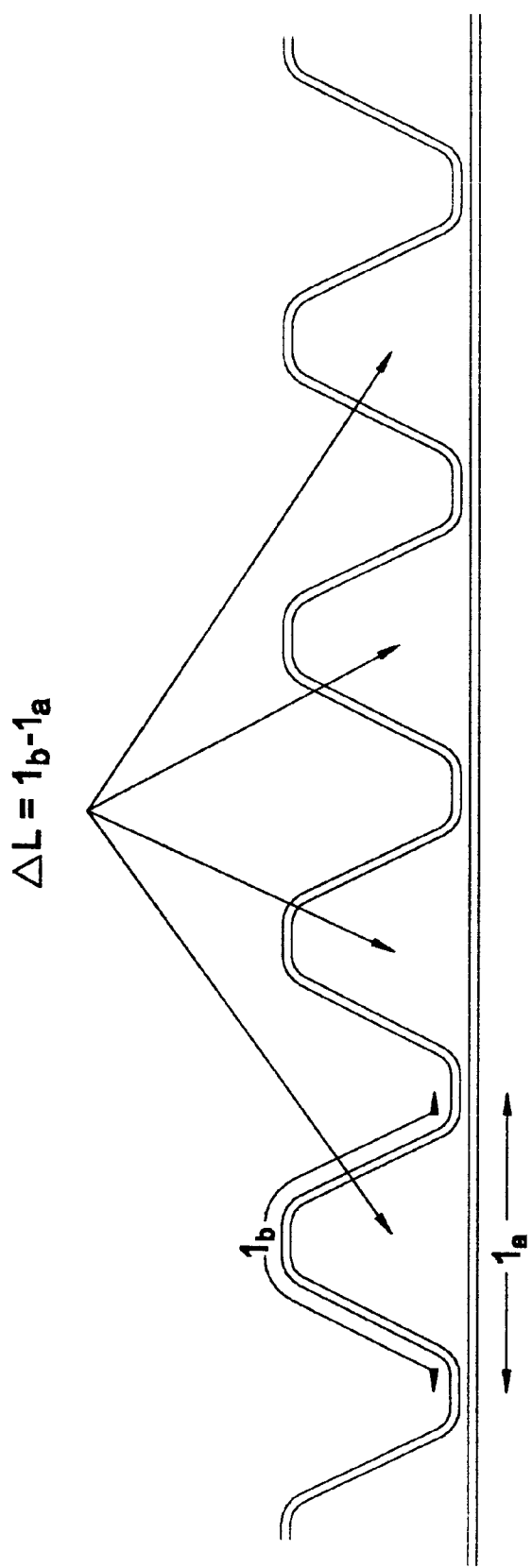
FIG. 1 is a schematic of a conventional resonant coupler.
Figure 2:
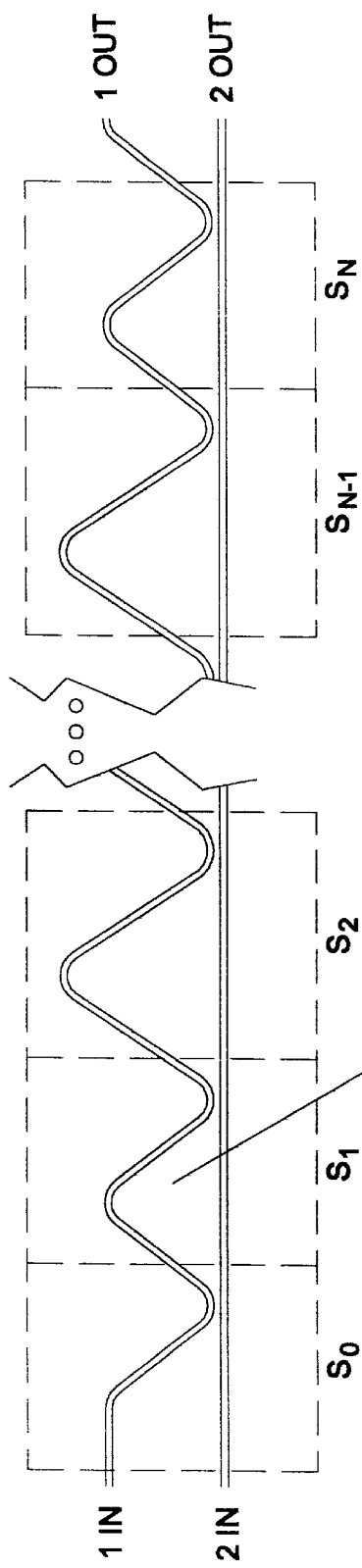
FIG. 2 is a schematic of a signal processing circuit forming a resonant coupling circuit according to an embodiment of the invention.
Figure 2A:
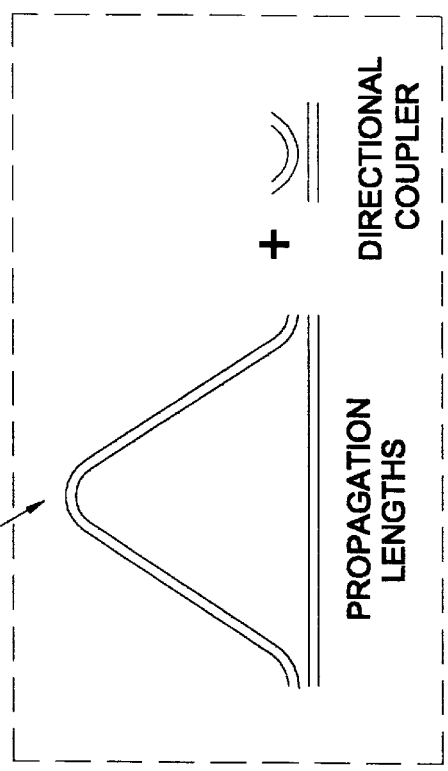
FIG. 2A is a detail showing separately differential propagation lengths in the waveguides and a directional coupler.

We represent the N stage GRC shown in FIG. 2 as a cascade of N+1 'segments', numbered 0 through N. Each segment consists of a portion from each of a pair of waveguides 1, 2 of unequal propagation lengths $L_{1,i}$, $L_{2,i}$ (which introduce a relative phase delay between the two waveguides 1, 2), followed by a directional coupler $C_i$. Note that the propagation lengths for segment zero—the furthest to the left in FIG. 2—contribute only to the phase of the GRC transfer function and, hence, can safely be set to zero. A directional coupler between two conduits of electromagnetic energy or waveguides is a device that couples electromagnetic energy from one conduit to the other. The design of such directional couplers is known in the art in itself.

In FIG. 2, let $E_{1(in)}$ be the electric field amplitude at the input port of waveguide 1 and let $E_{2(in)}$ be the electric-field amplitude at the input port of waveguide 2. The field amplitudes at the output ports are obtained by the transformation, $$\begin{pmatrix} E_{1(out)} \\ E_{2(out)} \end{pmatrix} = S \begin{pmatrix} E_{1(in)} \\ E_{2(in)} \end{pmatrix} \quad (2)$$

where $$S = \prod_{k=N}^{0} S_k \quad (3)$$

and where $S_k$ is the transfer matrix of segment 'k' for k=0,1,2 . . . , N.

To specify the $S_k$, we make the following definitions. Let $\sin \theta_k$ be the amplitude coupling coefficient of directional coupler 'k'. Also, let $\beta$ be the propagation constant, defined as $\beta = 2\pi n_{eff}/\lambda$, where $\lambda$ is a wavelength selected from the wavelengths of the frequencies at which the resonant coupler is resonant, and $\Delta L_k$ be the delay difference between the arms of segment 'k', that is, the difference in propagation lengths between the waveguides 1, 2 between two successive couplers $C_i$ and $C_{i+1}$. For k=0,1,2, . . . , N, we set $\beta \Delta L_k = n_k \beta \Delta L + \phi_k$, where $\{n_k\}$ is a set of co-prime positive integers, and $\{\phi_k\}$ is a set of phase parameters between 0 and $2\pi$. $\Delta L$ is determined by equation 1, and depends on the intended free spectral range of the resonant coupler. Without loss of generality, we set $\Delta L_0 = n_0 = \phi_0 = 0$.

Further defining, $z \equiv e^{j\beta \Delta L}$, we have, $$S_k \begin{bmatrix} \cos\theta_k & -j\sin\theta_k \\ -j\sin\theta_k & \cos\theta_k \end{bmatrix} \times \begin{bmatrix} e^{-j\beta\Delta L_k/2} & 0 \\ 0 & e^{j\beta\Delta L_k/2} \end{bmatrix} = \quad (4)$$

$$\begin{bmatrix} \cos\theta_k e^{-j\frac{\phi_k}{2}} z^{\frac{n_k}{2}} & -j\sin\theta_k e^{j\frac{\phi_k}{2}} z^{\frac{n_k}{2}} \\ -j\sin\theta_k e^{-j\frac{\phi_k}{2}} z^{\frac{n_k}{2}} & \cos\theta_k e^{j\frac{\phi_k}{2}} z^{\frac{n_k}{2}} \end{bmatrix}.$$

Note that the $n$, $\theta$, and $\phi_k$ can be interpreted as 'circuit parameters' which determine the GRC's impulse response.

The transformation matrix, S, can be represented in the form, $$S = \begin{bmatrix} H(z) & -F_*(z) \\ F(z) & H_*(z) \end{bmatrix} \quad (5)$$

where $$X_*(z) \equiv X^*\left(\frac{1}{z^*}\right).$$

Taken together, equations (2) and (5) imply that when the input to the GRC is exclusively through port 1, H(z) and F(z) are, respectively, the through port and cross port transfer functions. Let M be the total number of delay units for an N stage GRC. That is, $$M = \Sigma_{k=1}^{N} n_k. \quad (6)$$

By virtue of equations (3), (4), and (5), the cross port transfer function can be expressed in terms of an M th order polynomial, $$F(z) = j(\Sigma_{k=0}^{M} b_k z^{-k}) z^{M/2}. \quad (7)$$

The coefficients, $b_k$, can be interpreted as complex expansion coefficients for an FIR filter of order M.

An N stage GRC generates the transfer function of an Mth order FIR filter. By contrast, recall that an N stage RC generates the transfer function of only an Nth order FIR filter. Since, $M=\Sigma_{k=1}^{N} n_k$ $n_k$ can be much greater than N, the GRC offers the potential to generate higher order FIR filters than does the RC. We have freedom to specify only N+1 of the M+1 complex expansion coefficients of a GRC (i.e., by manipulating the 2×(N+1) real circuit parameters $\theta_k$ and $\phi_k$). The remaining M−N coefficients in equation (7) are fixed by a set of constraints.

In the following, we derive the relations between the expansion coefficients for transfer functions H(z) and F(z) and the GRC circuit parameters, $n_k$, $\theta_k$, and $\phi_k$. We follow a recursive procedure parallel to that used by Jinguji and Kawachi in Ref [2]. The procedure involves recursively separating off the final stage from a given GRC to define a new GRC and deriving a set of consistency conditions associated with each such separation.

To begin, note that the cross and through port transfer functions for and N stage GRC are of order $M=\Sigma_{k=1}^{N} n_k$ and can be expressed as;

$$F(z) = j(\Sigma_{k=0}^{M} b_k z^{-k}) z^{M/2}$$

$$H(z) = (\Sigma_{k=0}^{M} a_k z^{-k}) z^{M/2} \quad (A1)$$

Also recall from equations (3) and (5) that the transfer matrix for the GRC has the form, $$S = \prod_{k=N}^{0} S_k = \begin{bmatrix} H(z) & -F_*(z) \\ F(z) & H_*(z) \end{bmatrix} \quad (A2)$$

Applying $S_N^{-1}$ to both sides of (A2), we obtain, $$S^{[N-1]} = S_N^{-1} S = \prod_{k=N-1}^{0} S_k \quad (A3)$$

The new transfer matrix may be expressed in the form:

$$S^{[N-1]} = \begin{bmatrix} H^{[N-1]}(z) & -F_*^{[N-1]}(z) \\ F^{[N-1]}(z) & H_*^{[N-1]}(z) \end{bmatrix} \quad (A4)$$

where, $H^{[N-1]}(z)$ and $F^{[N-1]}(z)$ are, respectively, the through port and cross port transfer functions of the N−1 stage GRC. Noting that, $$S_N^{-1} = \begin{bmatrix} \cos\theta_k e^{j\frac{\varphi_k}{2}} z^{\frac{n_k}{2}} & j\sin\theta_k e^{j\frac{\varphi_k}{2}} z^{\frac{n_k}{2}} \\ j\sin\theta_k e^{-j\frac{\varphi_k}{2}} z^{\frac{n_k}{2}} & \cos\theta_k e^{-j\frac{\varphi_k}{2}} z^{\frac{n_k}{2}} \end{bmatrix} \quad (A5)$$

and substituting equations (A1), (A2), (A4), and (A5) into equation (A3), we obtain, $$H^{[N-1]}(z) = \left(\sum_{k=n_N}^{M} (a_k \cos\theta_N - b_k \sin\theta_N) z^{-k+n_N} e^{j\varphi_N/2}\right) z^{(M-n_N)/2} + \quad (A6)$$

$$\left(\sum_{k=0}^{n_N-1} (a_k \cos\theta_N - b_k \sin\theta_N) z^{-k} e^{j\varphi_N/2}\right) z^{(M+n_N)/2}$$

$$F^{[N-1]}(z) = j\left(\sum_{k=0}^{M-n_N} (a_k \sin\theta_N - b_k \cos\theta_N) z^{-k} e^{j\varphi_N/2}\right) z^{(M-n_N)/2} + \quad (A7)$$

$$j\left(\sum_{k=M-n_N+1}^{M} (a_k \sin\theta_N - b_k \cos\theta_N) z^{-k} e^{-j\varphi_N/2}\right) z^{(M-n_N)/2}$$

We must have, $$H^{[N-1]}(z) = \left(\sum_{k=0}^{M-n_N} a_k^{[N-1]} z^{-k}\right) z^{(M-n_N)/2},$$

so equation (A6) implies that, $$a_k^{[N-1]} = (a_{k+n_N} \cos\theta_N - b_{k+n_N} \sin\theta_N) e^{j\varphi_N/2} \quad (A8)$$

for $k = 0, 1, 2, \ldots M - n_N$ as well as the $n_N$ consistency conditions, $$0 = (a_k \cos\theta_N - b_k \sin\theta_N) \text{ for } k=0,1,2, \ldots n_N-1 \quad (A9)$$

Similarly, equation (A7) implies that, $$b_k^{[n-1]} = (a_k \sin\theta_n + b_k \cos\theta_N) e^{-j\varphi_N/2} \quad (A10)$$

for $k = 0, 1, 2, \ldots M - n_N$ as well as the $n_N$ consistency conditions, $$0 = (a_k \sin\theta_N + b_k \cos\theta_N) \text{ for } k=M-n_N+1, \ldots, M. \quad (A11)$$

It is not difficult to show that the two sets of consistency conditions (A9) and (A11) are, in fact, equivalent by virtue of the unitarity of S.

By repeatedly applying the above procedure, we derive the following set of recursion relations:

$$a_k^{[m-1]} = (a_{k+n_m}^{[m]} \cos\theta_m - b_{k+n_m}^{[m]} \sin\theta_m) e^{j\frac{\varphi_m}{2}} \quad (A12)$$

$$b_k^{[m-1]} = (a_k^{[m]} \sin\theta_m + b_k^{[m]} \cos\theta_m) e^{-j\frac{\varphi_m}{2}}$$

for $k=0,1,2, \ldots, \Sigma_{p=1}^{m} n_p$ and $m=1,2, \ldots, N$ and where it is understood that the expansion coefficients $a_k$ and $b_k$ of equations (A1) have been re-labeled as $a_k^{[N]}$ and $b_k^{[N]}$, respectively. In addition, we obtain the following set of consistency conditions, $$\theta_m = \tan^{-1}\left(\frac{a_k^{[m]}}{b_k^{[m]}}\right) \quad (A13)$$

$$\varphi_m = -\arg\left(\frac{a_{n_m}^{[m]} b_0^{[m]} - b_{n_m}^{[m]} a_0^{[m]}}{(a_0^{[m]})^2 + (b_0^{[m]})^2}\right) \quad (A14)$$

for $k=0,1,2, \ldots, n_m-1$, and $m=1,2, \ldots, N$.

Note that for each m, there are $n_m+1$ consistency conditions and 2 parameters (namely, $\theta_m$ and $\phi_m$) to be specified in terms of $a_k^{[m]}$ and $b_k^{[m]}$. Summing over m, and recalling that $M=\Sigma_1^N n_m$, we find that there are, in total, M−N constraints.

In the preceding analysis with equations A1–A14, a set of recursion relations and constraint equations are derived for the circuit parameters, $\theta_k$ and $\phi_k$, in terms of the expansion coefficients of the through port and cross port transfer functions of a GRC. While these equations shed light on the GRC's constraint structure, they are not very useful if our goal is to choose circuit parameters so as to match a given set of cross port (or through port) expansion coefficients. Below, we present an algorithm for generating a set of M+1 non-linear equations for the cross port transfer function's expansion coefficients, $b_k$, in terms of circuit parameters $\theta_k$ and $\phi_k$.

1. List all $2^N$ cross port paths.
2. For each path, take the product of the following factors associated with each coupler and delay length along the path:
   a) $-j \sin \theta_k$ [if the path crosses from one waveguide to the other at coupler k].
   b) $\cos \theta_k$ [if the path stays on the same waveguide through coupler k].
   c) $e^{-j\phi_k}$ [if the path proceeds through the delay arm of stage k.]
   d) 1 [if the path does not go through the delayed arm at stage k.]
   Define the 'path coefficient' as the product of these factors.
3. $b_k$ equals the sum of the path coefficients for all paths which proceed through k delay arms.

A similar algorithm generates a set of equations for the expansion coefficients $a_k$, of the through port transfer function.

GRCs and RCs as Add/drop Multiplexers

The GRC circuit design can offer significant advantages over the RC design in a specific digital filtering application—that of the optical add/drop multiplexer As optical wavelength division multiplexed (WDM) communications systems come of age, there will be a need for add/drop multiplexers—devices which can route a selected channel either on to or off of the link while leaving the flow of other channels unaffected. Much attention has focused on the use of RCs for designing optical add/drop multiplexers [1–4].

Figure 3:
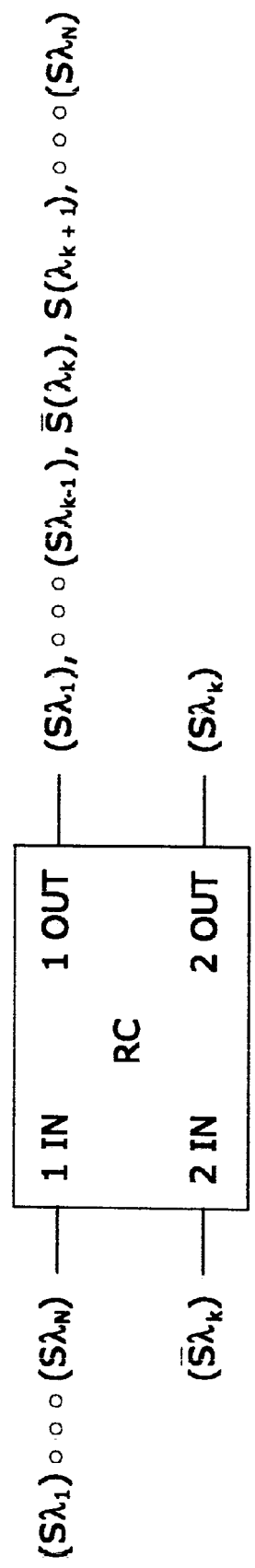
FIG. 3 is a block schematic showing the resonant coupler function in which multiplexed signals are fed to input port 1, one signal is routed to output port 2, while the remaining signals are routed through to output port 1, and a signal fed into input port 2 is crossrouted to output port 1.

When used as an add/drop multiplexer, the RC functions as follows. Suppose $N_{Ch}$ channels with carrier wavelengths, $\lambda_1, \ldots, \lambda_{N_{Ch}}$ are wavelength division multiplexed onto a single optical fiber which is fed into one of the RC's input ports (say port 1 as shown in FIG. 3). The RC routs the 'drop' channel at a selected wavelength, $\lambda_k$, to the cross output port while routing the remaining channels to the 'through' output port (output ports 2 and 1, respectively, in FIG. 3). If desired, a new signal at $\lambda_k$ can be added simultaneously to the multiplexed link by feeding it into input port 2. In this fashion, a signal at $\lambda_k$ can be added to the multiplexed link while another signal at $\lambda_k$ is dropped from the link.

The number of distinct channels, $N_{Ch}$, which can be individually selected (i.e., added or dropped) by the multiplexer at a given level of cross talk relates to the filter's finesse at the corresponding level of attenuation. Letting CT be the desired cross talk (in decibels), we have [3];

$$N_{Ch}=2F \quad (8)$$

where F is the filter's finesse at an attenuation equal to CT (i.e., F is the free spectral range of the filter divided by it full pass band width at an attenuation equal to CT).

From equation (8), it is clear that to maximize the number of channels which can be individually selected by an add/drop multiplexer, we must maximize its finesse at the acceptable level of cross talk. Kostrzewa and Petermann[3] point out that the N'th order FIR filter which achieves the desired maximum finesse has a transfer function of the Dolph-Chebyshev form:

$$F(z) = -j\frac{T_N(z_0(z^{1/2} + z^{-1/2}))}{T_N(z_0)} \quad (9)$$

where $T_N(z)$ is the Chebyshev polynomial of the first kind and of order N and $$z_0 = \cosh\left(\frac{\operatorname{arccosh}(10^{-CT/20dB})}{N}\right). \quad (10)$$

Figure 4:
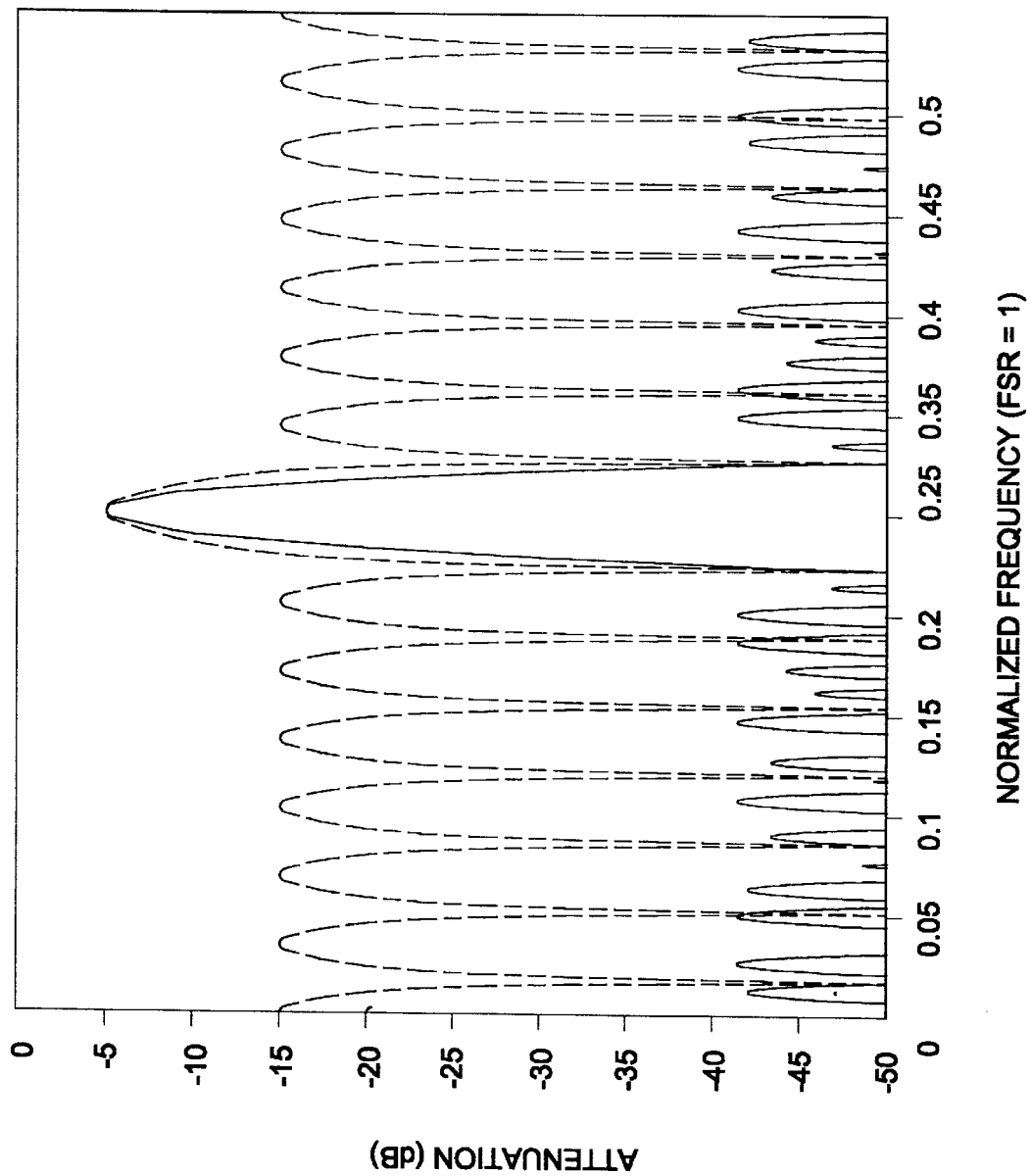
FIG. 4 is a graph of minimum bandwidth transmission responses for a conventional 14 stage RC filter with CT=−10 dB (dashed line) and a 14 stage GRCA filter according to an embodiment of the invention with CT=−36.1 dB (solid line)

Kostrzewa and Petermann conclude that the optimal design for an N stage RC add/drop multiplexer is that with $\theta_k$ and $\phi_k$ chosen so as to generate a Dolph-Chebyshev transfer function. The dashed curve in FIG. 4, shows the transmission response for a 14 stage RC filter with Dolph-Chebyshev transfer function and CT=−10 dB. Note that all stop band lobes have the same maximum transmission response.

Our problem is now to search for N stage GRC filters which achieve greater finesse at a given CT than the optimal stage RC.

To simplify matters, let us constrain attention to GRCs which satisfy:

$$n_k = n_{N+1-K} \text{ for } k=1,2,\ldots,N. \quad (11)$$

and $$\begin{aligned}\theta_k &= \theta_{N-k} \\ \varphi_k &= 0\end{aligned} \text{ for } k = 1, 2, \ldots, N. \quad (12)$$

with $$\Sigma_{k=0}^N \theta_k = (2m-1)\pi/2 \quad (13)$$

for some positive integer, m, with the convention that $0<\theta_k<\pi$. It is easy to show that GRCs satisfying (11) and (12) give rise to cross port transfer functions, F(z), with real expansion coefficients satisfying $b_k = b_{m-k}$ and having linear phase response. Condition (13) ensures that the transmission response is unity for the resonant frequencies (i.e., at z=1).

Figure 5:
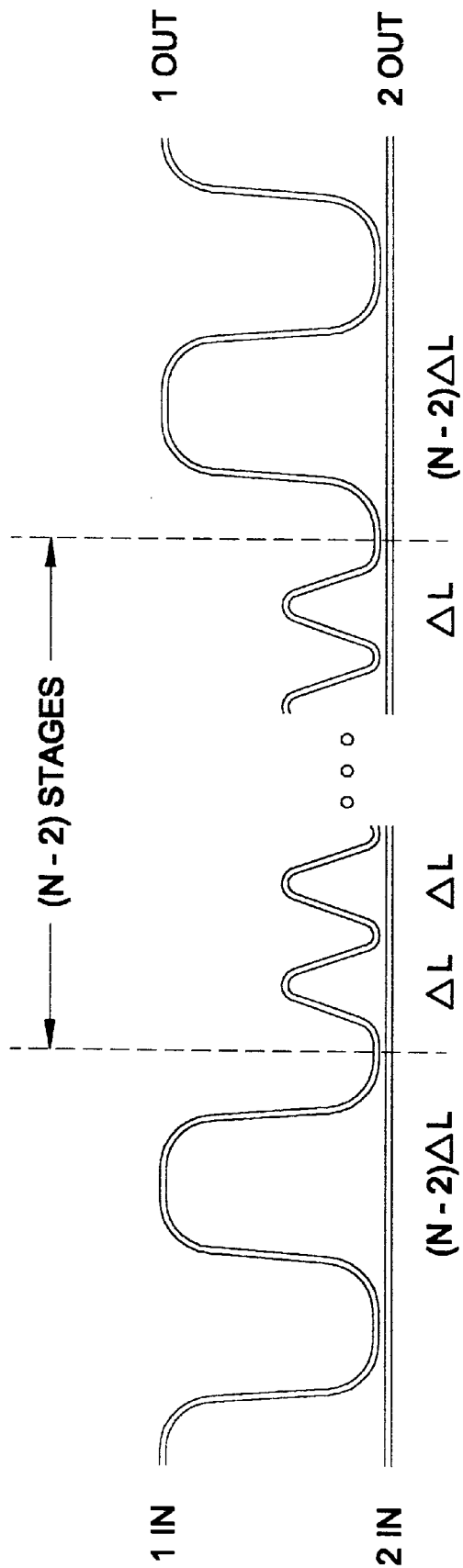
FIG. 5 is a schematic showing an N stage generalized coupler according to the invention.
Figure 6:
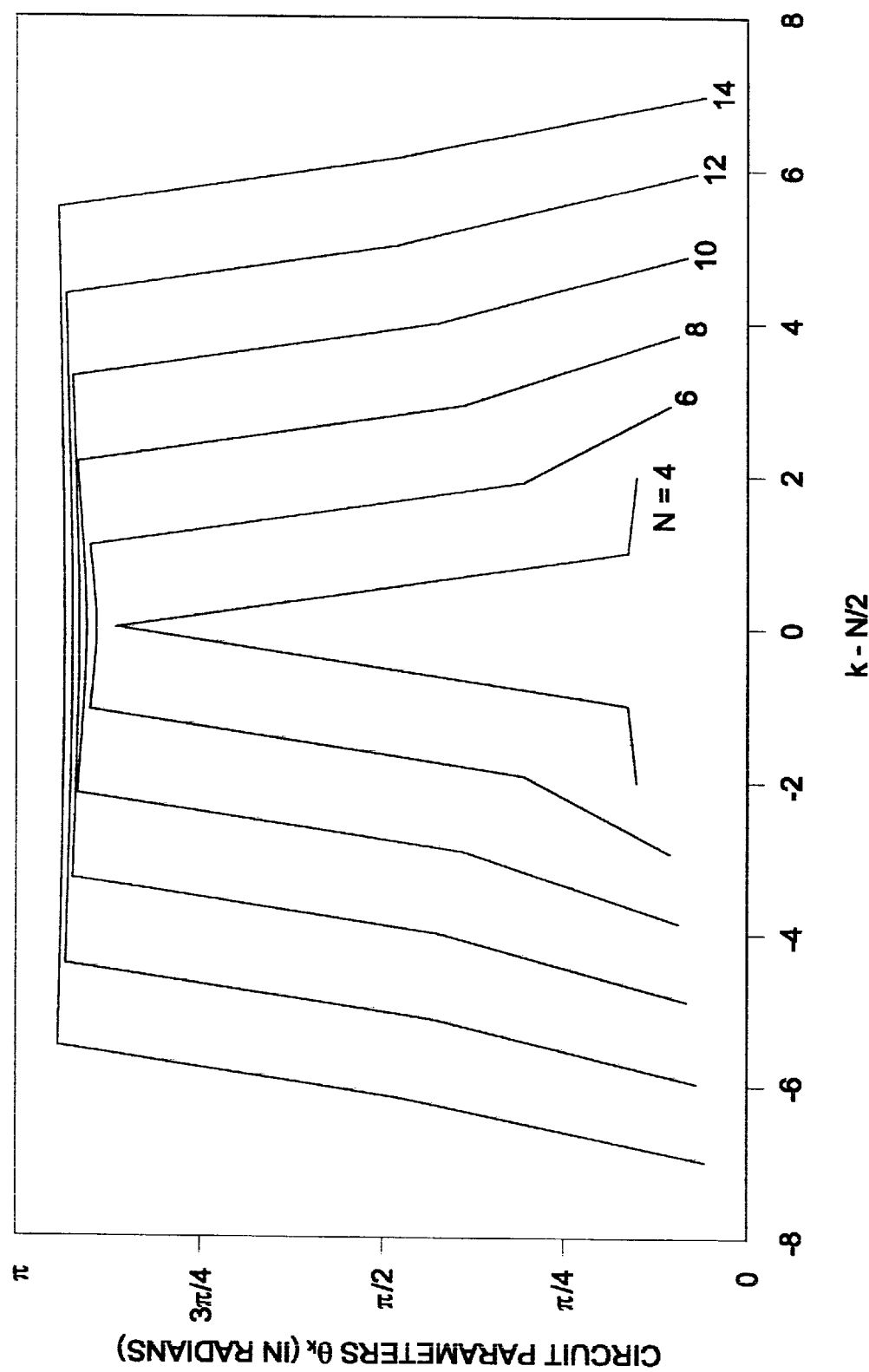
FIG. 6 is a graph showing plots of $\theta_k$ distributions for GRCAs according to the invention with N stages and finesse, F=10.

Using optimization routines to select $n_k$ and $\theta_k$, we uncovered several families of N stage GRCs which achieve higher finesse (at a given CT and FSR) than can be achieved with an N stage RC having a Dolph-Chebyshev transfer function. GRCs in one family offer particularly high finesse. We will call a GRC of this type a "GRC of Type A" or a "GRCA". An N stage GRCA has initial and final delay lengths of (N−2)ΔL separated by N−2 stages with delay lengths of ΔL (see FIG. 5). FIG. 6 shows optimal $\theta_k$ distributions for GRCAs with F=10. Note that the optimal $\theta_k$ distributions, all satisfy equation (9) with m=N−2.

FIG. 4 compares the transmission response, T=|F(z)|², of a 14 stage RC to a 14 stage GRCA. Note that the GRCA filter has higher finesse than the RC filter and much greater stop band attenuation (−36.1 dB as compared to −10 dB). To understand the greatly improved performance of the GRCA filter, recall that it has a transfer function of order M where M=3N−6=36. Meanwhile, the RC filter has a transfer function of order N=14.

Since, the expansion coefficients of the GRCA filter are subject to M−N=22 constraints, the GRCA does not achieve the optimal combination of narrow pass band and high stop band attenuation which could be achieved with a 36'th order Dolph-Chebyshev transfer function. Nonetheless, it does manage to come reasonably close.

Figure 7:
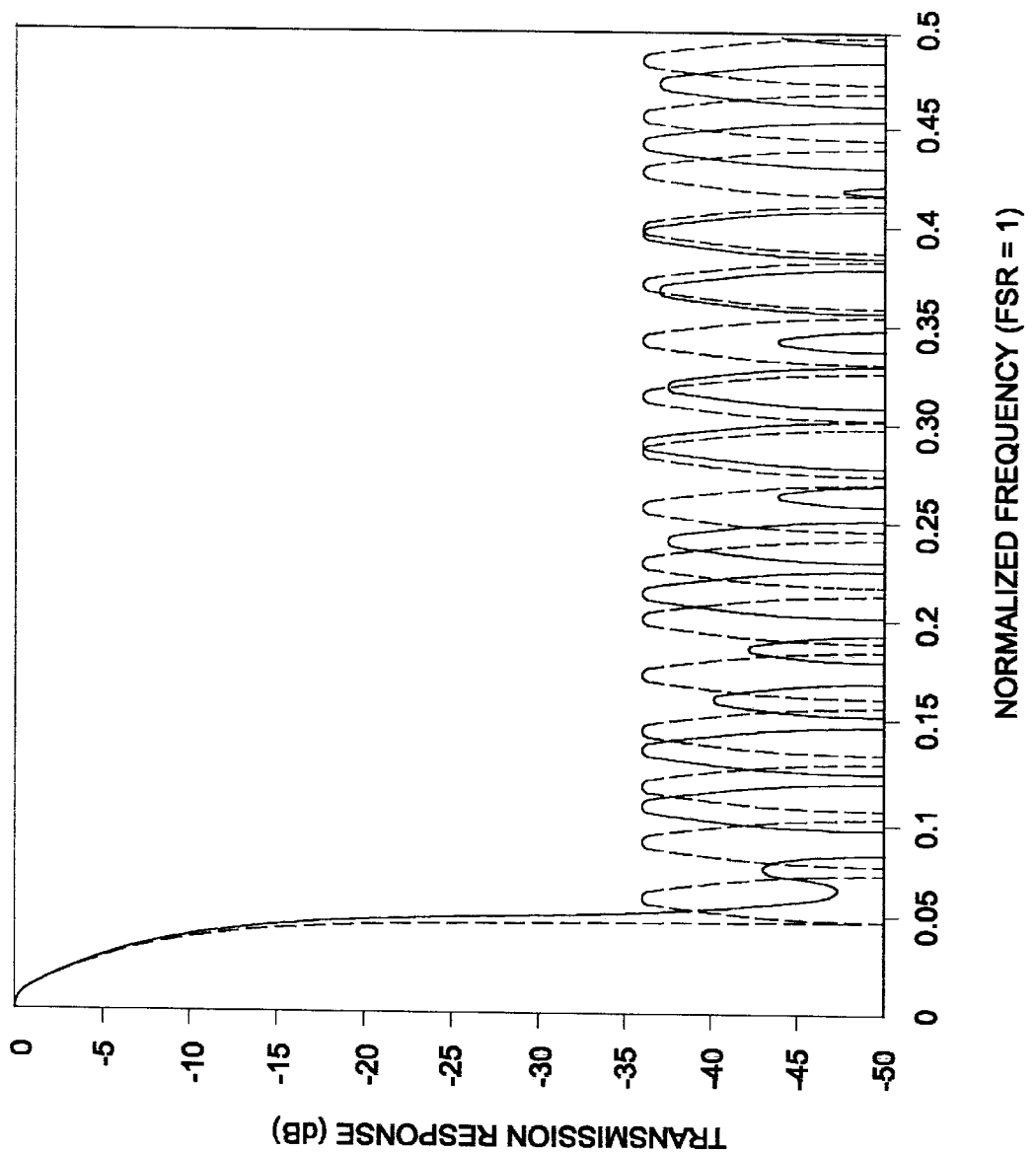
FIG. 7 is a graph showing comparison of transmission responses for a 32 stage conventional RC and a 14 stage resonant coupler according to the invention.

FIG. 7 compares the transmission response of the 14 stage GRCA to that of a 32 stage RC with a Dolph-Chebyshev transfer function. Both filters have the same maximum stop band transmission. Also note that the pass bands for the two filters are quite similar: the GRCA has slightly narrower pass band width for T>−27.5 dB, while the RC has slightly narrower pass band width below this. The noise equivalent bandwidth of the 14 stage GRCA is lower than that of the 32 stage RC because the GRCA has better mean attenuation over the stop band. In fact, the noise equivalent bandwidth of the 14 stage GRC closely matches that of a 34 stage Dolph-Chebyshev RC filter at the same CT.

Figure 8:
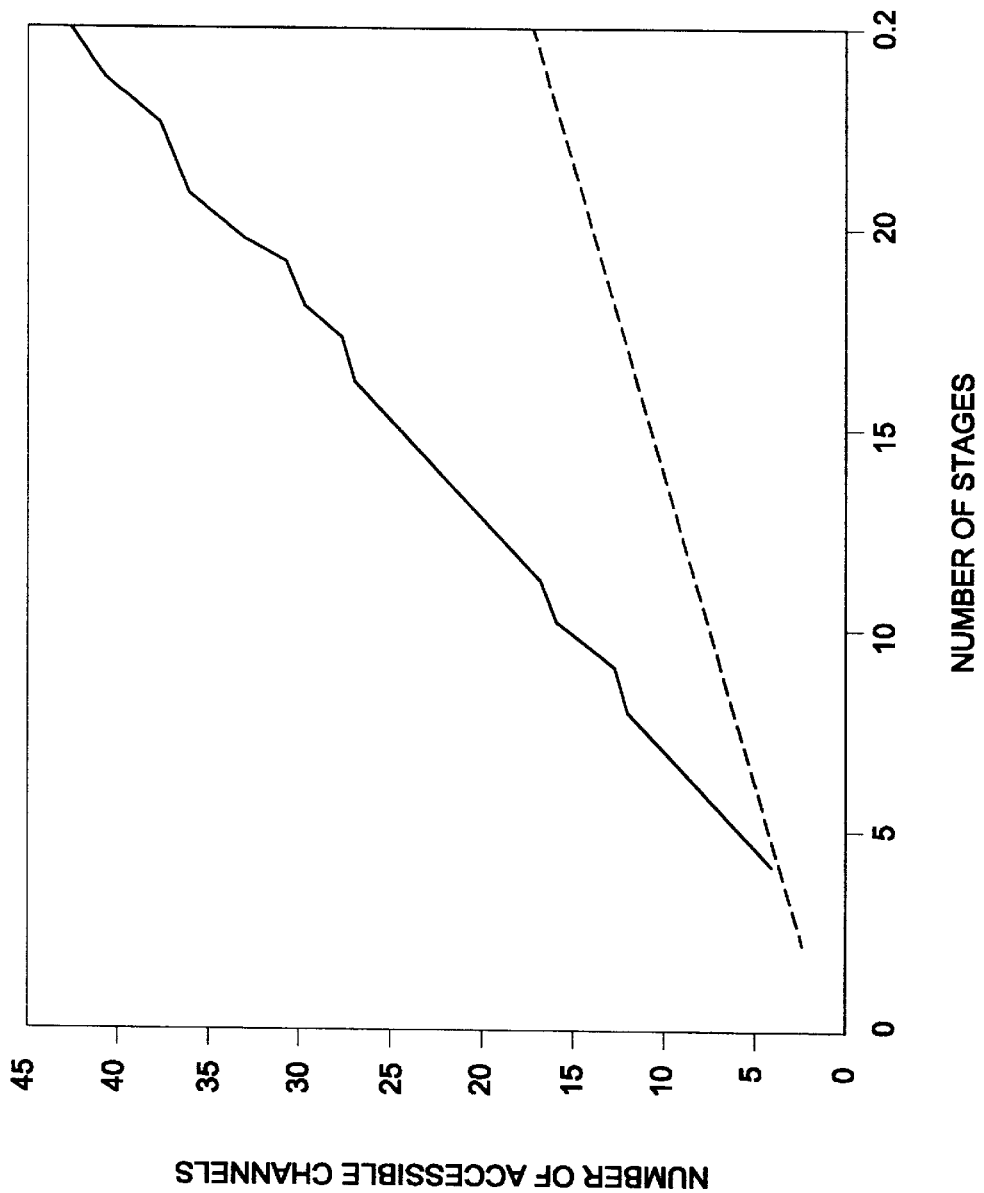
FIG. 8 is a graph showing a comparison of number of channels verses number of stages for a conventional RC (dashed line) and a resonant coupler according to the invention.

Using equation (8) and simulated transmission responses for GRCA and RC add/drop multiplexers at CT=−33dB, we obtained estimates for the number of channels which could be selected by each type of device at this level of cross talk. FIG. 8 shows the results. The dashed line plots the number of channels which can be selected by RC multiplexers with transfer functions of the Dolph-Chebyshev form: the solid line plots the same for GRCA multiplexers. The ratio of the slopes of the two lines is approximately 2.7, suggesting that in the limit of large N, a GRCA multiplexer can select about 2.7 times as many channels as an RC multiplexer at CT −33 dB.

FIG. 8, however, does not tell the entire story. Note that CT is an estimate of the maximum cross talk in a given channel due to another single channel. When large numbers of channels are involved, the cumulative cross talk due to all interfering channels strongly dominates over the maximum single channel cross talk. For large numbers of channels, the cumulative cross talk is a function of the mean single channel cross talk which, in turn, is determined by the mean stop band attenuation. We find, for large N, that the mean stop band attenuation of a GRCA approaches that of a Dolph-Chebyshev RC which has three times as many stages. Looking at the problem from another perspective, we find that a GRCA multiplexer can select close to three times as many channels as a Dolph-Chebyshev RC having the same mean single channel cross talk.

Potential Impact of Fabrication Uncertainties

In practice, uncertainties in coupling strengths of the directional couplers will limit the performance of both RCs and GRCAs. To compare the vulnerability of GRCAs and RCs to uncertainties in $\theta_k$, we ran a series of simulation sin which we perturbed desired distributions of $\theta_k$ by uniform distributions of pseudo-random numbers ranging from −Δθ to +Δθ. We then simulated the transmission response resulting from each perturbed $\theta_k$ distribution and calculated the mean stop band attenuation.

Figure 9:
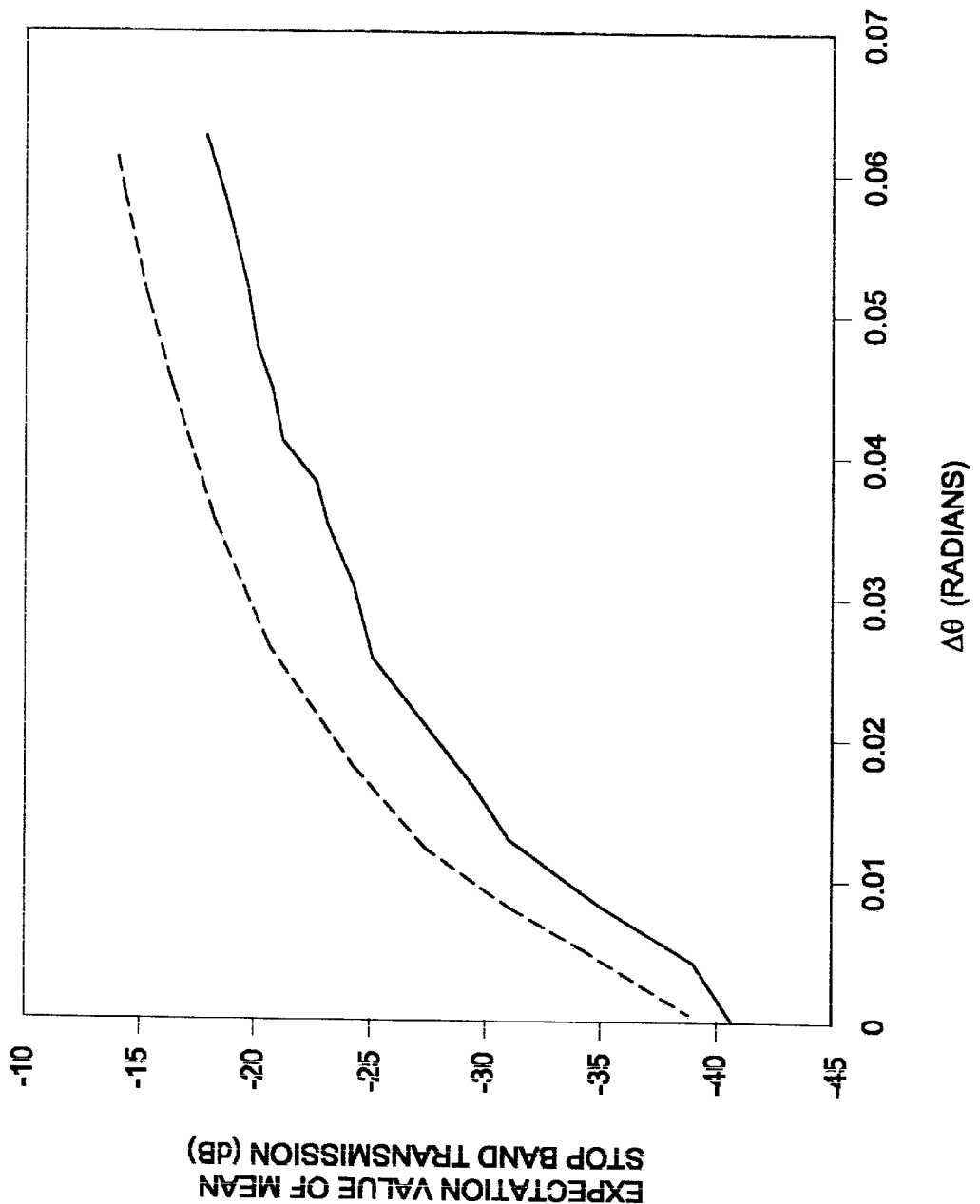
FIG. 9 is a graph showing a comparison of a 32 stage conventional RC (dashed curve) and a 14 stage GRCA according to the invention (solid curve). The horizontal axis plots maximum deviation of OK from optimal values, while the vertical axis plots the expectation value of mean stop band transmission (averaged over 100 sample distributions).

FIG. 9 provides information about the vulnerability to uncertainties in $\theta_k$ for the 14 stage GRCA and the 32 stage RC whose transmission responses are shown in FIG. 7. Plotted on the horizontal axis is Δθ. Plotted on the vertical axis is the expectation value for the mean stop attenuation (averaged over a sample size of 100 different perturbed $\theta_k$ distributions at each value of Δθ).

We see from FIG. 9 that when the $\theta_k$ actually correspond to their optimal values (i.e., Δθ=0), the 14 stage GRCA achieves about 1.5 dB better mean stop band attenuation than the 32 stage RC. However, when 0.01π<Δθ<0.02π, the GRCA achieves a mean stop band attenuation which is roughly 4 dB better than that of the RC. A corresponding difference in mean single channel cross talk is to be expected.

We have presented a novel generalization of the resonant coupler and discussed the theory of these devices. We have shown that GRCs have FIR transfer functions which can be of much higher order than the transfer functions of Rcs with the same number of stages. However, the expansion coefficients of the GRC transfer functions are subject to constraints.

We have demonstrated that add/drop multiplexers made with GRCAs can select more individual channels than add/drop multiplexers made with RCs having the same number of stages (when the number of stages is large, the improvement approaches a factor of 3). We have found that GRCAs are less vulnerable to uncertainties in their circuit parameters than are RCs with comparable transmission response.

Since, resonant couplers can provide arbitrary finite impulse response filters, they have many potential applications other than as add/drop multiplexers(e.g., as optical equalizers and multi-pass band filters). We expect GRCs will offer performance advantages for these other applications as well.

This work was supported by the Natural Sciences and Engineering Research Council of Canada (NSERC), Bell Northern Research (BNR) and TRLabs through the NSERC/BNR/TRLabs Industrial Research Chair in Fiber Optic Communications at the University of Alberta and by and NSERC Collaborative Project Grant.

We claim:

1. An add/drop multiplexer, comprising:

first and second conduits of electromagnetic energy;

a series of N+1 successive couplers Ck, where k=1 . . . N+1, for coupling electromagnetic energy between the first and second conduits of electromagnetic energy, the couplers being spaced from each other along the first and second conduits of electromagnetic energy and having a coupling strength $\theta_k$;

the first and second conduits of electromagnetic energy having delay differentials $\Delta L_k$ between successive couplers $C_k$ and $C_{k+1}$, for k=1 . . . N, the delay differentials $\Delta L_k$ not being all the same; and the $\Delta L_k$ are selected so that when carriers of electromagnetic energy having wavelengths $\lambda_1$ . . . $\lambda_{NCh}$ are propagating in the first conduit of electromagnetic energy, one or more, but fewer than $N_{ch}$ carriers of electromagnetic energy having wavelengths $\lambda_i$ are coupled to the second conduit of electromagnetic energy while carriers of electromagnetic energy having wavelengths $\lambda$ not equal to $\lambda_i$ are passed through on the first conduit of electromagnetic energy.

2. The add/drop multiplexer of claim 1 in which the conduits are optical waveguides and the couplers are optical directional couplers.

3. The add/drop multiplexer of claim 2 in which the signal processing circuit, and the first and second conduits of electromagnetic energy have delay differentials between successive couplers defined by $$\beta \Delta L_k = \beta n_k \Delta L + \Phi_k$$

where $n_k$ is a set of co-prime positive integers, $\beta$ is defined by $\beta=2\pi n_{eff}/\lambda$, $\Delta L$ is defined by $\Delta L=c/n_{eff}\Delta f$, c is the speed of light in a vacuum, $n_{eff}$ is the effective refractive index of the conduit, $\lambda$ is a wavelength selected from a range of carrier wavelengths $\lambda_1 \ldots \lambda_{NCh}$ for which the add/drop multiplexer is resonant, $\Phi_k$ is a phase parameter between 0 and $2\pi$, and $\Delta f$ is a pre-selected spectral range of the add/drop multiplexer.

4. The add/drop multiplexer of claim 3 in which the $\Delta L_k$ and the coupling ratios $\theta_k$ are selected so that the add/drop multiplexer has a maximum finesse at a given level of cross-talk.

5. The add/drop multiplexer of claim 3 in which there are N+1 couplers and the differential delays $\Delta L_i$ are selected so that $\Delta L_1=(N-2)\Delta L$, $\Delta L_N=(N-2)\Delta L$ and $\Delta L_i=\Delta L$ for $i=2 \ldots N-1$.

6. A signal processing circuit, comprising:

first and second conduits of electromagnetic energy;

a series of N+1 successive couplers Ck, where $k=1 \ldots N+1$, for coupling electromagnetic energy between the first and second conduits of electromagnetic energy, the couplers being spaced from each other along the first and second conduits of electromagnetic energy and the couplers having coupling strengths $\theta_k$;

the first and second conduits of electromagnetic energy having delay differentials $\Delta L_k$ between successive couplers $C_k$ and $C_{k+1}$, where $k=1 \ldots N$, the delay differentials $\Delta L_k$ not being all the same; and the $\Delta L_k$ and the $\theta_k$ being selected so that the circuit has a maximum finesse at a given level of cross-talk.

7. The signal processing circuit of claim 6 in which the conduits are optical waveguides and the couplers are optical directional couplers.

8. The signal processing circuit of claim 7 in which the signal processing circuit, and the first and second conduits of electromagnetic energy have delay differentials between successive couplers defined by $$\beta \Delta L_k = \beta n_k \Delta L + \Phi_k$$

where $n_k$ is a set of co-prime positive integers, $\beta$ is defined by $\beta=2\pi n_{eff}/\lambda$, $\Delta L$ is defined by $\Delta L=c/n_{eff}\Delta f$, c is the speed of light in a vacuum, $n_{eff}$ is the effective refractive index of the conduit, $\lambda$ is a wavelength selected from a range of wavelengths $\lambda_1 \ldots \lambda_{NCh}$ for which the circuit is resonant, $\Phi_k$ is a phase parameter between 0 and $2\pi$, and $\Delta f$ is a pre-selected spectral range of the signal processing circuit.

9. A method of creating an N stage generalized resonant coupler, wherein the resonant coupler comprises first and second conduits of electromagnetic energy, a series of N+1 successive couplers Ck, where $k=1 \ldots N+1$, for coupling electromagnetic energy between the first and second conduits of electromagnetic energy, the couplers being spaced from each other along the first and second conduits of electromagnetic energy and having a coupling strength $\theta_k$, the first and second conduits of electromagnetic energy having delay differentials $\Delta L_k$ between successive couplers $C_k$ and $C_{k+1}$, for $k=1 \ldots N$, the method comprising the steps of:

selecting a desired impulse response for the resonant coupler; and selecting the $\theta_k$ and the $\Delta L_k$ so that the difference of the impulse response of the resonant coupler from the desired impulse response is minimized.

10. The method of claim 9 in which the first and second conduits of electromagnetic energy have delay differentials between successive couplers defined by $$\beta \Delta L_k = \beta n_k \Delta L + \Phi_k$$

where $n_k$ is a set of co-prime positive integers, $\beta$ is defined by $\beta=2\pi n_{eff}/\lambda$, $\Delta L$ is defined by $\Delta L=c/n_{eff}\Delta f$, c is the speed of light in a vacuum, $n_{eff}$ is the effective refractive index of the conduit, $\lambda$ is a wavelength selected from a range of wavelengths $\lambda_1 \ldots \lambda_{NCh}$ for which the circuit is resonant, $\Phi_k$ is a phase parameter between 0 and $2\pi$, and $\Delta f$ is a pre-selected spectral range of the resonant coupler.

11. The method of claim 9 in which the $\Delta L_k$ and the coupling ratios $\theta_k$ are selected so that the resonant coupler has a maximum finesse at a given level of cross-talk.

* * * * *